Figure 1:
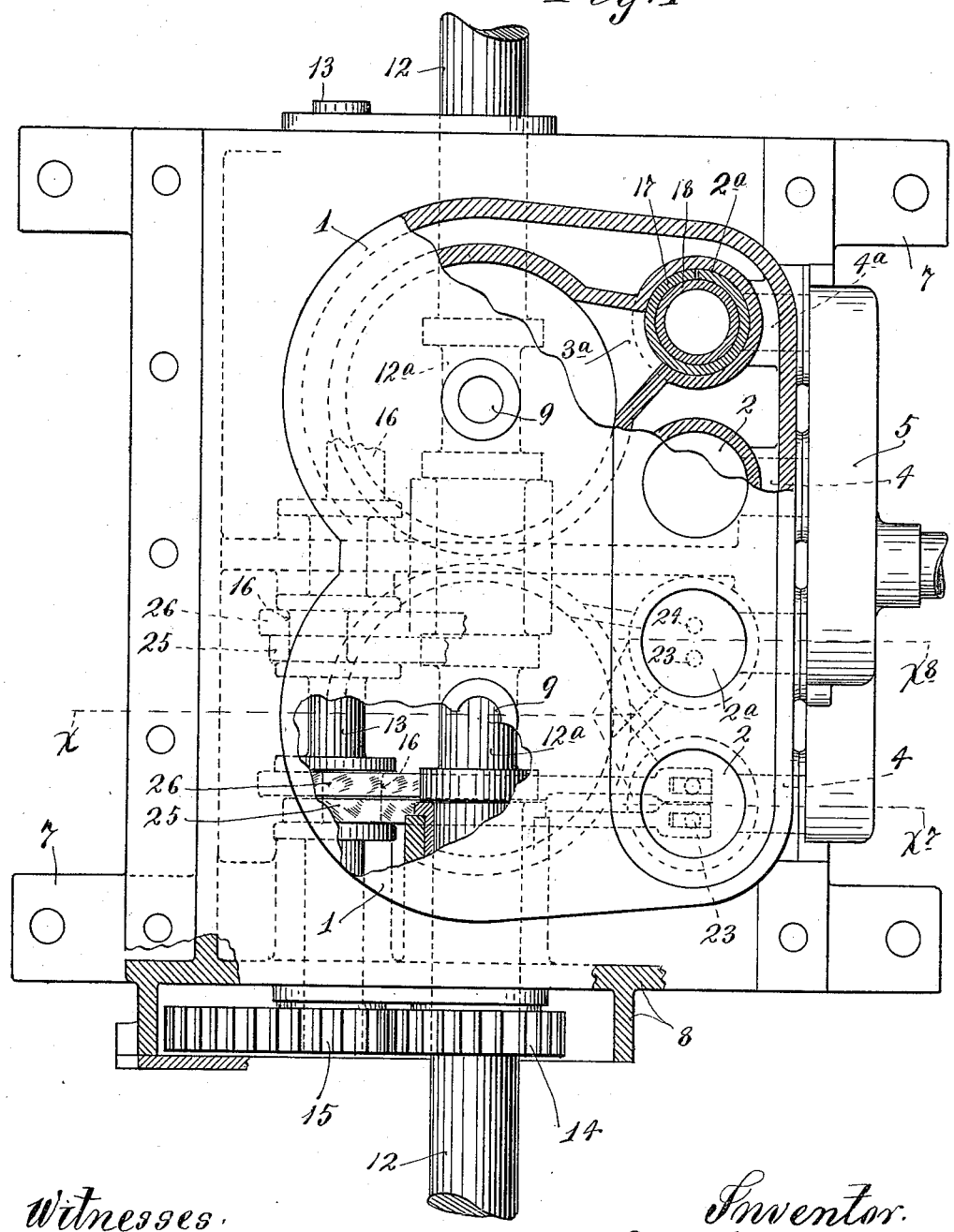

O. M. BERGSTROM.
EXPLOSIVE ENGINE.
APPLICATION FILED APR. 19, 1912.

1,150,244.

Patented Aug. 17, 1915.
8 SHEETS—SHEET 3.

Witnesses.
A. H. Opsahl.
H. L. Opsahl.

Inventor.
Oscar M. Bergstrom
By his Attorneys
Williamson Merchant

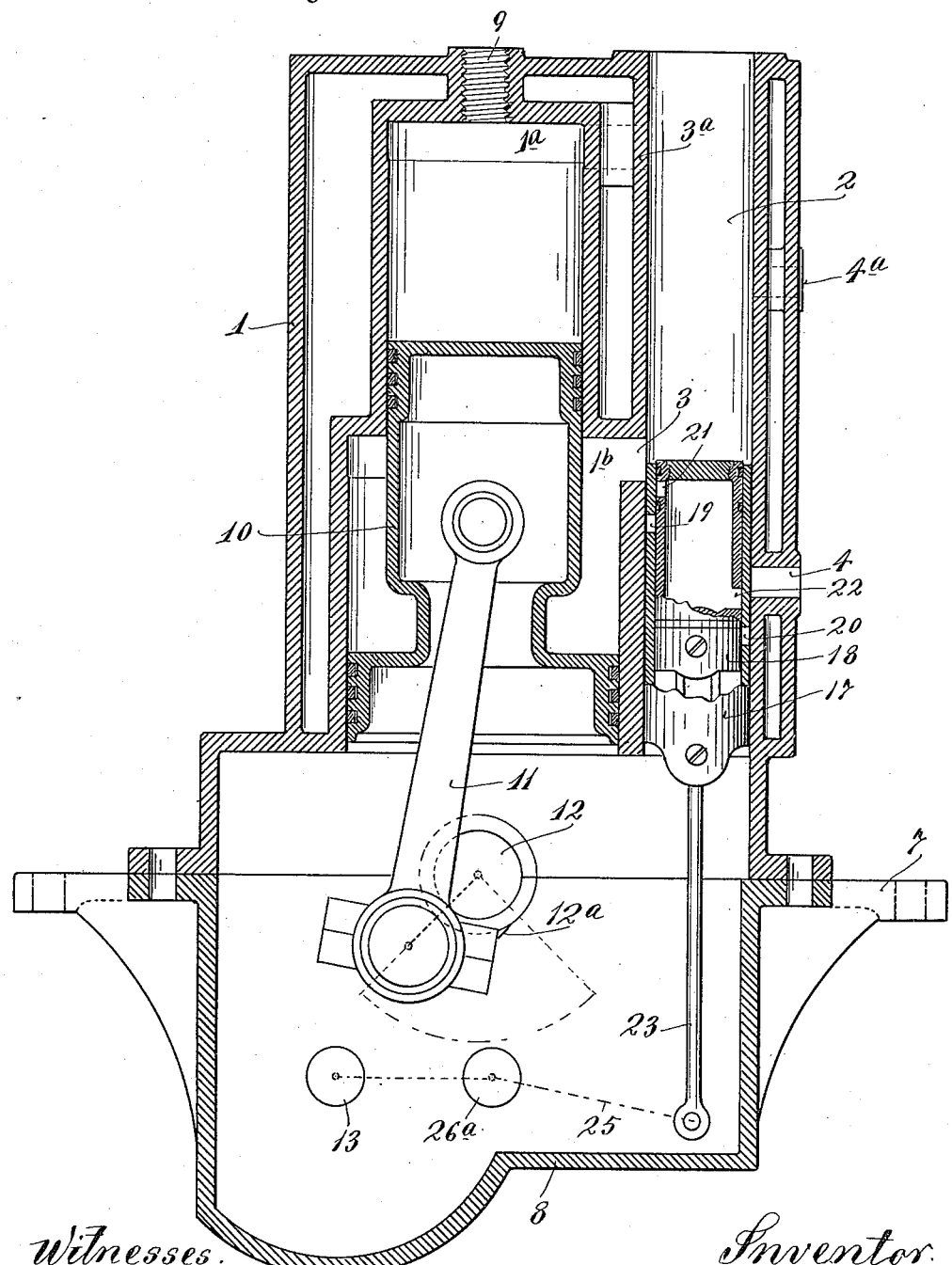

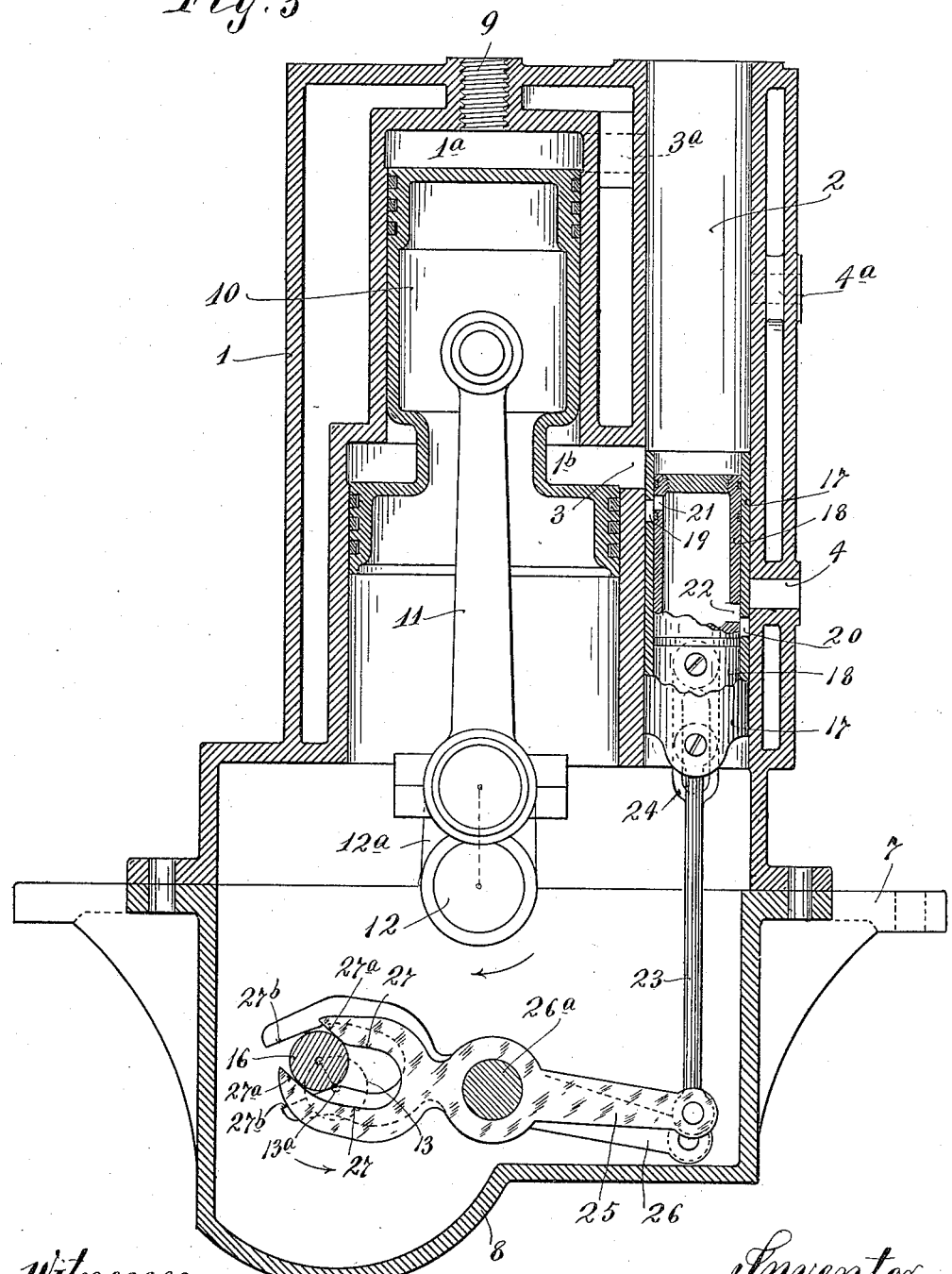

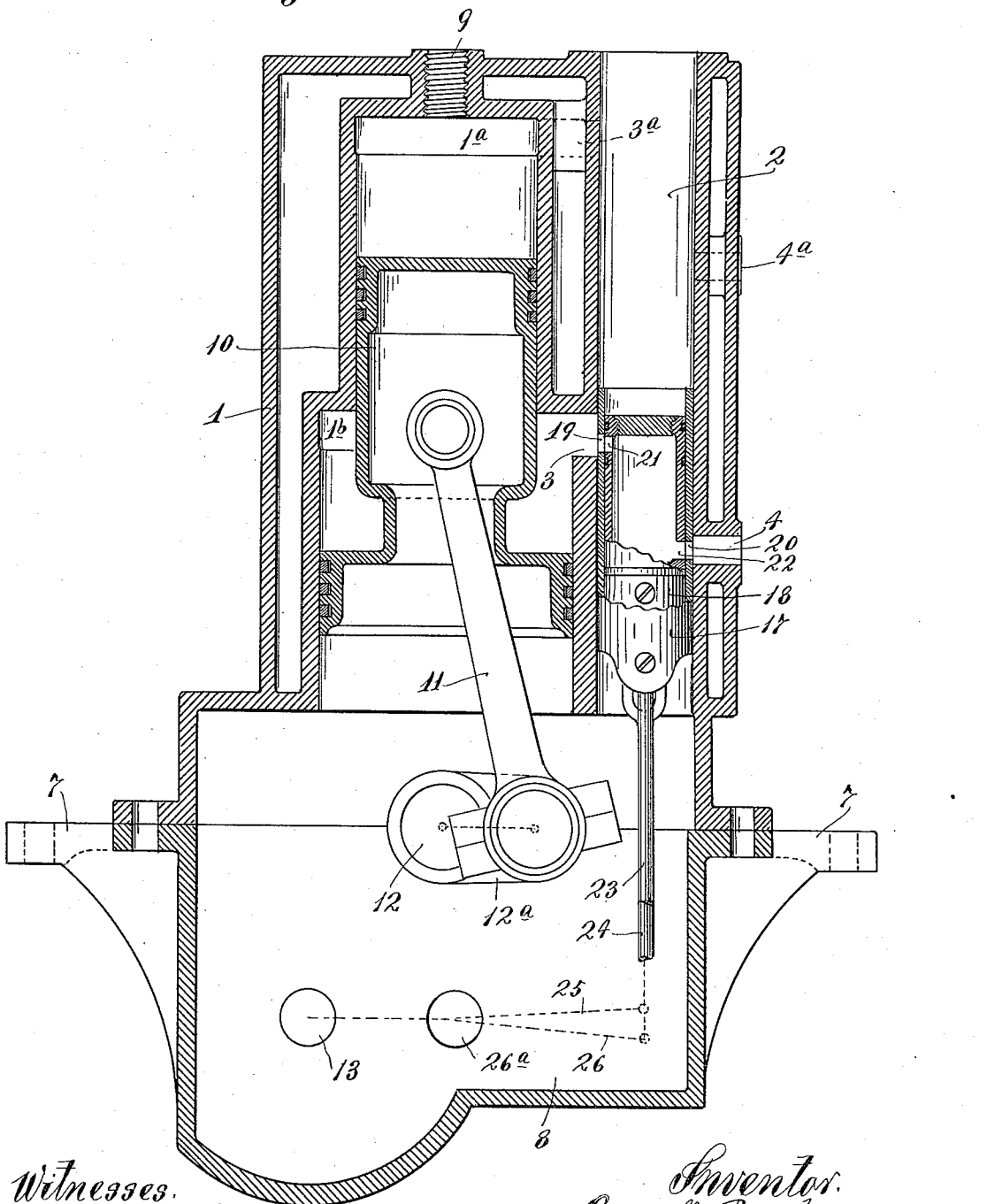

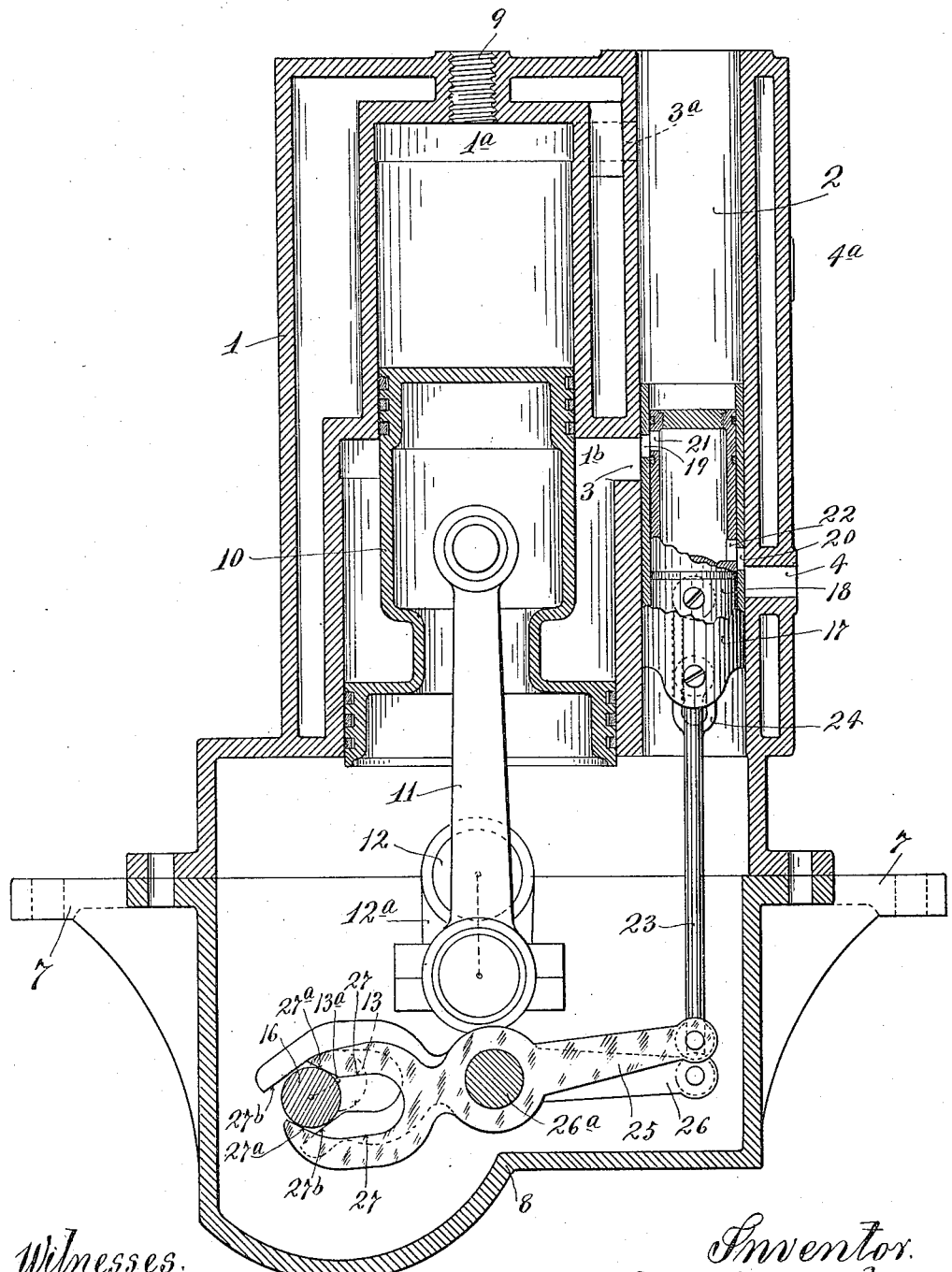

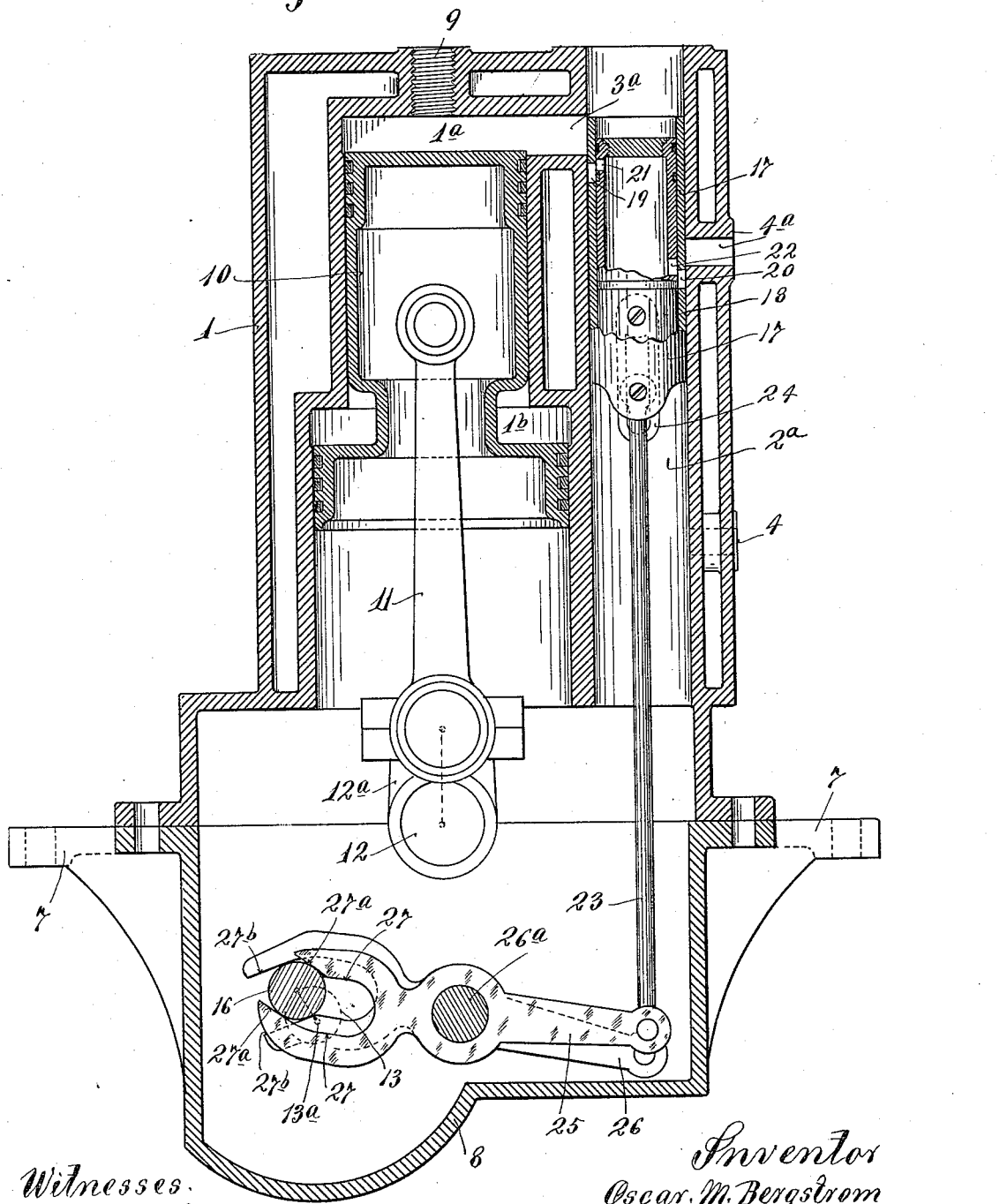

UNITED STATES PATENT OFFICE.

OSCAR M. BERGSTROM, OF MINNEAPOLIS, MINNESOTA, ASSIGNOR TO UNIVERSAL MANUFACTURING COMPANY, OF MINNEAPOLIS, MINNESOTA, A CORPORATION OF MINNESOTA.

EXPLOSIVE-ENGINE.

1,150,244.  Specification of Letters Patent.  Patented Aug. 17, 1915.

Application filed April 19, 1912. Serial No. 691,857.

*To all whom it may concern:*

Be it known that I, OSCAR M. BERGSTROM, a citizen of the United States, residing at Minneapolis, in the county of Hennepin and State of Minnesota, have invented certain new and useful Improvements in Explosive-Engines; and I do hereby declare the following to be a full, clear, and exact description of the invention, such as will enable others skilled in the art to which it appertains to make and use the same.

My invention relates to internal combustion, or so-called explosive engines, and has for its object to generally improve the construction and operation thereof.

Generally stated, the invention consists of the novel devices and combinations of devices hereinafter described and defined in the claims.

Hitherto, in explosive engines, puppet valves have, in some instances, been dispensed with and replaced by a large sleeve working, as a valve, between the cylinder and piston, and in other instances, by a pair of large concentric sleeves having the relation of primary and secondary valve acting elements, interposed between the cylinder and piston. Both of these arrangements have inherent disadvantages, certain of which may be stated as follows: The necessary large diameter of the sleeve or sleeves and the large number of wearing surfaces produces a great amount of friction and a corresponding amount of wear. The piston and interior of the explosion chamber must be cooled through the surrounding sleeve or sleeves, and this is very difficult. It is extremely difficult to maintain tight joints between the piston, cylinder and the interposed sleeves, and slight wear greatly increases the tendency to leak. Also, these large sleeves interposed between the cylinder and piston are expensive to construct, hard to get at to repair or remove, difficult to repair when removed, and hard to maintain in good running condition. However, the use of a pair of coöperating primary and secondary valves or sleeves, when combined with the proper valve actuating mechanism, makes possible extremely rapid and properly timed port opening and closing movements, and when free from the objections above noted, makes possible an explosive or internal combustion engine of very high efficiency and generally improved action, in which the valve movement will be silent or substantially so.

With the above noted desirable and undesirable features in mind, I employ coöperating primary and secondary valves, which are located outside of the engine cylinder where they have no frictional engagement or contact with the piston or with the cylinder. These coöperating primary and secondary valves are preferably in the form of sleeves working, one within the other, and arranged for reciprocatory movement within a valve seat located immediately adjacent to the coöperating cylinder and extended parallel therewith. In connection with these valves, I employ valve actuating mechanism, also, of novel construction and arranged, to impart differential movements to the said primary and secondary valves, the timing being such that at certain times, the two valves move together as if one valve, and at certain other times, move at different speeds, and at other times, one of the valves will be moved while the other stands still. These relative movements are so timed that they give the most desirable and efficient port opening and closing movements, all as will hereinafter more fully appear.

The improved valve mechanism is adapted for use in connection with either multi-cylinder or single cylinder engines, but is especially designed and adapted for use in connection with explosive engines of the four-cycle type. However, certain features thereof, may be employed in connection with explosive engines of the two-cycle type.

My invention also involves as an additional feature of novelty, an arrangement of the said improved valve mechanism in connection with differential cylinders and pistons. In this arrangement, a single engine unit would comprise one differential cylinder and one differential piston, and the valve mechanism, when designed for coöperation with a four-cycle engine of this differential piston type would be arranged to control the port openings for alternate explosions in the two chambers of the cylinder. Otherwise stated, there would be an explosion for each complete rotation of the engine crank shaft, and the explosions in the two chambers would be alternated. This arrangement makes possible an engine of maximum efficiency in a very compact engine of minimum weight, size and cost.

The explosive engine illustrated in the drawings, is of the four-cycle type involving the differential cylinder and piston arranged to illustrate an engine which has been built and put into actual successful use.

In the accompanying drawings which illustrate the invention, like characters indicate like parts throughout the several views.

Referring to the drawings, Figure 1 is a plan view with some parts broken away, showing the improved explosive engine; Figs. 2 to 7, inclusive, are vertical sections taken on the irregular line $x—x^7$ on Fig. 1, but illustrating different positions of the piston valve mechanism, some parts being shown in full and some parts being removed; and Fig. 8 is a vertical section taken on the irregular line $x—x^8$ on Fig. 1.

The engine illustrated in the drawings is, as already indicated, of the four-cycle differential cylinder and piston type, and Fig. 1 illustrates two units, that is, two differential cylinders 1, each cylinder having two explosion chambers $1^a$ and $1^b$, the said cylinders, as shown, being water-jacketed. Each cylinder casting is formed with two long cylindrical valve seats 2 and $2^a$ that extend parallel to the cylinder axis, as close as practicable to the inner cylindrical surfaces and explosion chamber thereof. Each cylinder is provided with a large port 3 that opens from its explosion chamber $1^b$ into the coöperating valve seat 2, and with a similar port $3^a$ that opens from its explosion chamber $1^a$ into the coöperating valve seat $2^a$. The valve seats 2 and $2^a$ are provided, respectively, with intake ports 4 and $4^a$ that connect to an intake manifold 5. The upper extremities of the valve seats 2 and $2^a$ serve as exhaust ports and are all connected to an exhaust manifold 6. As shown, the two differential cylinders 1 are cast integral, and they are connected to a common base 7 having a crank shaft casing 8, the chief function of the latter of which is to contain oil. In the top of each cylinder is an ordinary sparking plug seat 9 opening into the respective explosion chambers $1^a$, and similar sparking plug seats, not shown, will open into the sides of the cylinders into the respective explosion chambers $1^b$. The sparking plugs, not shown, may be of any suitable construction and for the purpose of this case need not be further considered.

Working in each differential cylinder 1 is a differential piston 10. The two differential pistons 10 are, by connecting rods 11, connected to cranks $12^a$ of an engine crank shaft 12 that is journaled in suitable bearings formed in part on the base of the cylinder casting, and, in part, on the upper portion of the base casting 7. The cranks $12^a$ for the two differential pistons, will usually be set 180 degrees, the one ahead of the other. Located in the lower portion of the casing 8, journaled in suitable bearings on the sides thereof, and having its axis parallel to the axis of the crank shaft 12, is a valve actuating crank shaft or cam shaft 13. The engine crank shaft 12 carries a spur pinion 14 that meshes with the spur gear 15 on one outer end of the valve crank shaft 13. The gear 15 is twice the diameter of the pinion 14, so that the said valve actuating crank shaft 13 will be given one complete rotation for each two complete rotations of the engine crank shaft. For each differential cylinder, the crank shaft 13 is provided with a cam or eccentric acting crank 16, there being, of course, two of these cranks in the engine illustrated, both of which are located within the casing 8. These cranks 16 are set 180 degrees, the one ahead of the other.

Working in each valve seat 2 in direct contact therewith, is an outer valve sleeve or so-called primary valve sleeve 17, and working within each primary valve 17 is an inner valve sleeve, or so-called secondary valve 18. The primary valve 17 is opened both at its upper and lower ends, but said secondary valve is closed both at its upper and lower ends. The primary valve 17 is provided with ports 19 and 20, and the secondary valve 18 is provided with ports 21 and 22. The ports 19 and 21 and the ports 20 and 22 are adapted to be moved into registration at the proper times by longitudinal sliding movements of the said valves, in respect to each other.

The valves 17 and 18 in the seats 2 are arranged for coöperation with the ports 3 and 4, respectively, of the cylinder casting, and control the admission and exhausting, and from the explosion chamber $1^b$, while the valves 17 and 18, which are within the valve seats $2^a$, are located higher up and are arranged for coöperation with the ports $3^a$ and $4^a$ of the cylinder casting and control the admission and exhaust to and from the explosion chamber $1^a$. The lower ends of the valves 17 and 18 are connected by rods 23 and 24, respectively, to valve actuating levers 25 and 26, which, as shown, are intermediately pivoted on the fulcrum rod $26^a$, extended through the lower portion of the crank shaft chamber 8 and suitably secured to the sides thereof. The said levers 25 and 26 are located side by side in pairs, and they are provided with bifurcated or forked heads that embrace the crank 16. In Figs. 2 to 8 inclusive, the axis of the valve actuating crank shaft 13 is indicated at $13^a$. The pronged heads of both levers 25 and 26 are formed with parallel and coincident crank engaging surfaces 27. Outward of the said surfaces 27, the lever 25 is formed with parallel upwardly inclined crank engaging surfaces $27^a$, and the lever 26 is formed with parallel downwardly inclined crank engaging surfaces 27ᵇ. It is important to here note that the cam surfaces 27ᵃ of the lever 25 extend in an abrupt angle to and crosswise of the cam surfaces 27ᵇ of the lever 26. This produces a peculiar and highly important valve movement which will presently appear. It may be here stated, however, that when the common crank 16 is operated on the coincident parallel cam surfaces 27 of the two levers 25 and 26, the said two levers will move in unison, or as if one, and the primary and secondary valves 17 and 18 will, likewise, move in unison, or as if one. On the other hand, when the said crank 16 operates simultaneously upon the reversely inclined or extended crank surfaces 27ᵃ and 27ᵇ, the said levers 25 and 26, and hence, the primary and secondary valves, will be given very different movements.

Operation: The following description of the operation will follow only the action of the valves 17 and 18 in their control of the admission and exhaust into and from the lower explosion chamber 1ᵇ of one cylinder. Attention is first called to Fig. 2, which shows the position of the differential piston and the primary and secondary valves 17 and 18, approximately at the time of explosion, it being, of course, understood, that the explosion may take place either slightly before or slightly after the crank has reached its upper dead center, illustrated in Fig. 2. The engine crank shaft moves in the direction of the arrow marked thereon in Fig. 2 and in other views, and the valve actuating crank shaft 13 rotates in a reverse direction at one-half the speed. In the position of the valve shown in Fig. 2, the port 19 of the primary valve is closed by the secondary valve 18 and there is an extended lap of the primary valve upward past the cylinder port 3, so that the explosion chamber 1ᵇ is securely closed against the escape of gas at this time. Under the force of the explosion, the piston is moved downward and the crank shaft rotates about 135 degrees, to-wit, approximately to the position indicated by the dotted line y on Fig. 3, before the cylinder port 3 is uncovered to exhaust, by the upper end of the primary valve 17. When the crank reaches its first downward dead center, shown in Fig. 3, the port 3 has been well opened to exhaust, but the extreme opening of the said port takes place when the crank has moved about 90 degrees beyond the position shown in Fig. 3, to-wit, into the position shown in Fig. 4. During this much, to-wit, during approximately the first 225 degrees of the engine crank shaft movement, the valve actuating crank 16 of the shaft 13, engages with the coincident surfaces 27 of the two levers 25 and 26, so that, up to this time, the two valves 17 and 18 are moved downward together at the same rate of speed and will act as a single valve. Further rotary movement of the engine crank shaft from the position shown in Fig. 4, toward and to the position shown in Fig. 5, completes the exhaust or scavenging action, and it will be here noted that the exhaust takes place during approximately 225 degrees of movement of the engine crank shaft. This gives a good chance for complete scavenging action. While the engine crank shaft moves from the position shown in Fig. 4 into the position shown in Fig. 5, and to approximately 45 degrees beyond the position shown in Fig. 5, the crank 16 of the shaft 13 operates on the oppositely diverging cam surfaces 27ᵃ and 27ᵇ of the levers 25 and 26, respectively, and during this time, the secondary or inner valve 18 is held approximately in a stationary position, while the primary valve 17 is moved rapidly upward. The said primary valve closes the cylinder port 3 from exhaust approximately in the crank shaft position shown in Fig. 5, but continues the upward movement of the said primary valve for about 45 degrees of the engine crank shaft movement past the position shown in Fig. 5, thus giving one lap. When the engine crank shaft commencing its second rotation, passes slightly beyond the position shown in Fig. 5, the cylinder port 3 will be closed to exhaust and open to admission, but the full opening of ports to admission does not take place until the engine crank shaft is moved approximately 90 degrees on its second rotation, or to the position shown in Fig. 6, at which time, the ports 19 and 21 of the valves 17 and 18, register with each other and with the cylinder port 3, and the valve ports 20 and 22 register with each other and with the admission or intake port 4. When the engine crank shaft moves inward from the position shown in Fig. 6, about 60 degrees, the two valves 17 and 18 move together with the ports in full registration, thus giving a full admission. The closing of the admission ports is not completed, however, until the engine crank shaft, continuing its second rotation, moves to the position about 20 degrees beyond the position shown in Fig. 7. The engine is, therefore, open to admission of the explosive gas or vapor for little more than 180 degrees of engine crank shaft movement, and the compression takes place during the remainder of the second rotation of the engine crank shaft, to-wit, during approximately 160 degrees of the engine crank shaft movement, at which time, of course, the complete cycle of operation has been completed and the ports again stand in the position shown in Fig. 2, ready for the next explosion or just subject to an explosion.

Figure 2:
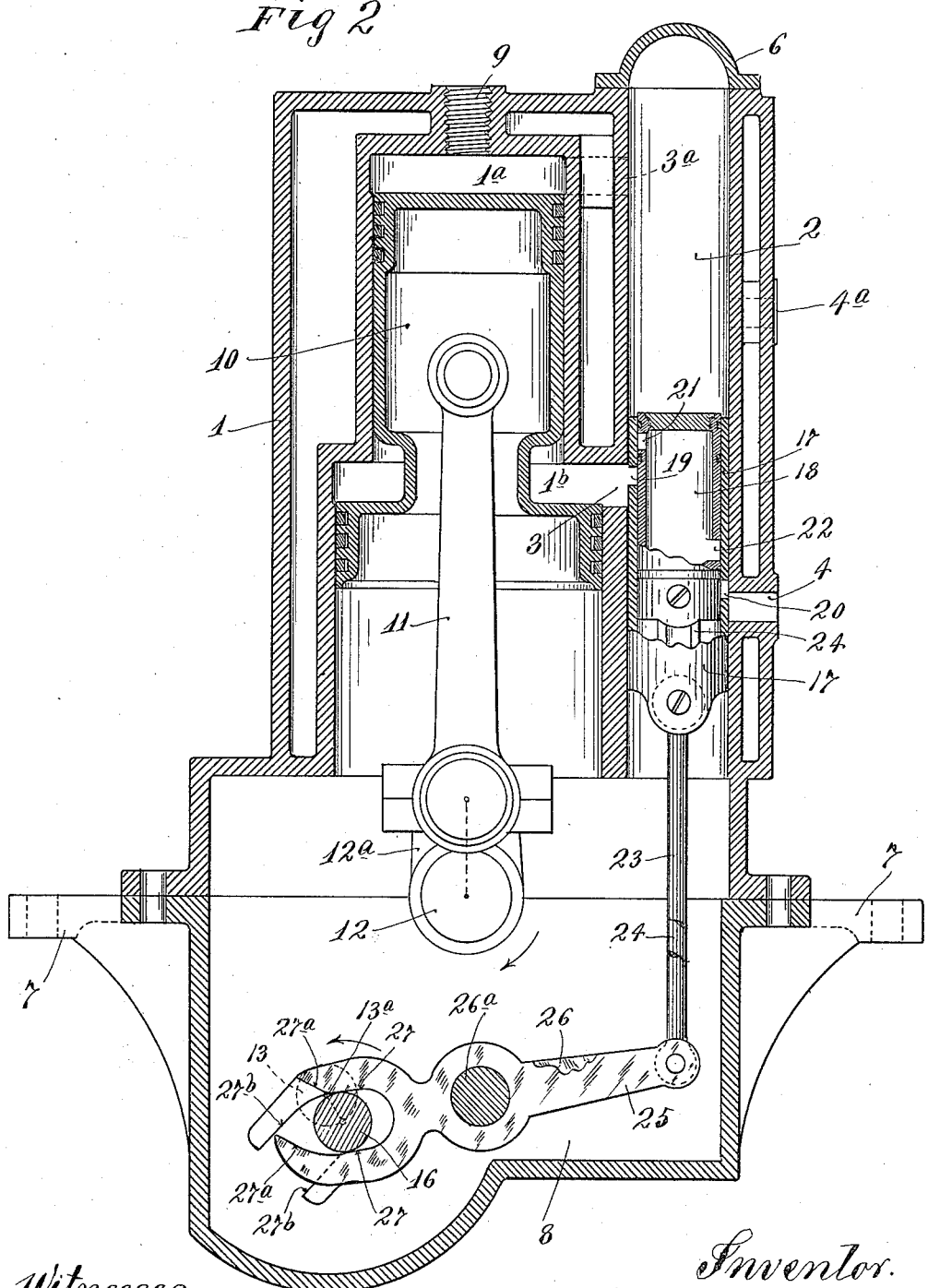
Figure 3:
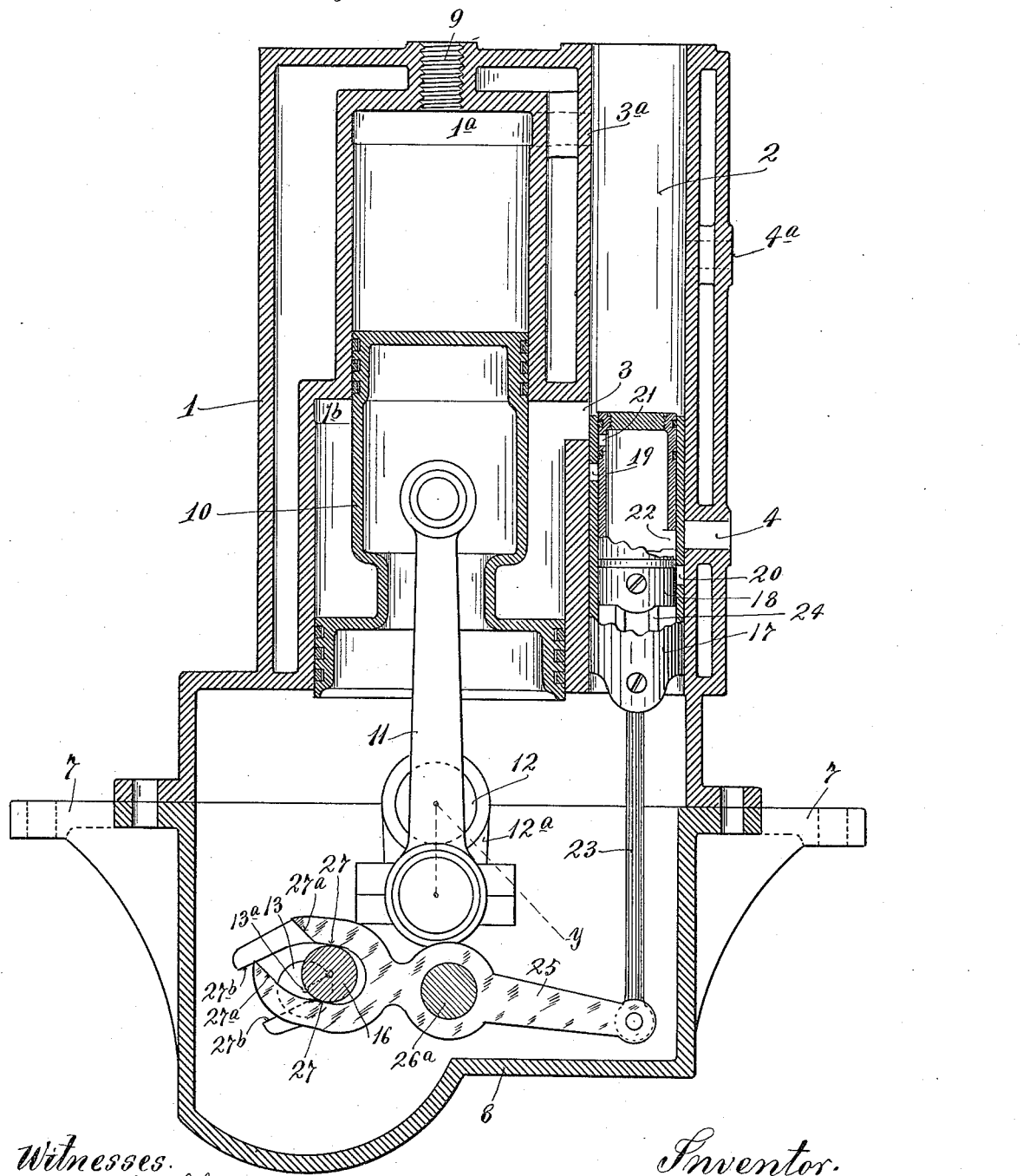

As already stated, when the engine crank is moved from the position shown in Fig. 2, past the position shown in Fig. 3, and into the position shown in Fig. 4, the two valves 17 and 18 move downward together. Also, it will be remembered that when the said engine crank shaft moves from the position shown in Fig. 2, approximately to a position 45 degrees beyond the position shown in Fig. 5, the primary valve 17 moves rapidly upward while the secondary valve 18 remains approximately stationary. Under continued rotation of the engine crank shaft from this latter noted position, into a position approximately 90 degrees beyond the position shown in Fig. 7, the two valves 17 and 18 are moved upward, at first the primary valves 17 moving rapidly and the secondary valve 18, slowly, and finally, the primary valve reaching approximately the position at rest, while the said secondary valve is moved rapidly upward, until the two valves again assume the overlapped position, with all ports closed, shown in Fig. 2. A double overlapping or closing of the ports to resist the explosive force is afforded at the time of explosion. Furthermore, the rapid opening and closing of the ports is accomplished and larger port openings are maintained for the greatest possible length of time.

In the exhaust and admission opening movements, the valve controlling movement is as rapid, and at certain periods, more rapid than the piston movement. This rapid valve movement is due, partly to the oblique cam surfaces of the valve actuating levers and is due partly to the speed multiplying movements of the said levers. In fact, any desired rapidity of valve movement may be obtained by the proper proportion of the said levers. In a two-cycle engine, with the valve actuating crank rotation only one-half as fast as the engine crank shaft, the valve actuating movement, unless multiplied, would be very slow, but in my invention, the valve actuating movement may be multiplied to any extent found desirable. The levers shown, are of the first class, but may, of course, be either of the second or third class.

The valves 17 and 18 which control admission and exhaust to the upper explosion chamber 1ª of the differential cylinder, operate in their cycle or action just as do the valves 17 and 18, above described, but their actuating crank 16, being set 180 degrees from the actuating crank 16, representing one rotation of the engine crank shaft, causes the explosion in the said chamber 1ª and all the other steps of the cycle, to take place just one rotation of the crank shaft ahead of or behind the corresponding cycle actions which take place in the lower chamber 1ᵇ. This, as is evident, gives one explosion in its differential cylinder and against its differential piston, for each complete rotation of the crank shaft.

The quick opening of the exhaust ports, quickly rids the engine of the hot products of combustion and thus assists in keeping the engine cool, also, prevents accumulation of carbon within the engine. The continued full opening of the admission ports insures a good charge of fresh gas or explosive vapor. Also, the very act of drawing the cold gas or explosive vapor through the primary and secondary valves, serves to keep down the temperature of the said valves. The exhaust gases, it will be noted, are not, in this preferred arrangement, passed through the valves, but are simply passed over the tops of the same, and hence, have a minimum tendency to heat the same.

The so-called primary and secondary valves are preferably of sleeve-like form and are arranged to reciprocate, one within the other, and the outer within its valve seat, but the invention may be modified in this respect, and the said valves might be given oscillatory or reciprocatory movements.

As herein already made clear, the broad features of this invention are not at all limited to the use of differential cylinders and pistons. However, the use of differential cylinders and pistons and the combination therewith, with improved valve mechanism, involves novelty of high importance, certain advantages of which have already been stated. It may be further stated, however, that the use thereof gives an explosive engine of compact form, few parts, economical construction, and in which there is a perfect mechanical and explosive balance.

What I claim is:

1. In an explosive engine, the combination with a cylinder, a piston, an engine crank shaft and connecting rod, of a valve actuating crank shaft driven from said engine shaft, a valve coöperating with ports in said cylinder, and a lever connected to said valve and having a bifurcated portion with cam surfaces actuated by said valve actuating crank.

2. In an explosive engine, the combination with a cylinder, a piston, an engine crank shaft and connecting rod, of a valve actuating crank shaft driven from said engine shaft, a valve coöperating with ports in said cylinder, and a lever connected to said valve and having a bifurcated portion with angular or crooked cam surfaces actuated by said valve actuating crank.

3. In a four-cycle explosive engine, the combination with a cylinder, a piston, a crank shaft, and connecting rod, of a valve actuating crank driven from said engine crank shaft at one-half the speed thereof, valves controlling admission and exhaust to and from said cylinder and a pair of levers independently connected to said valves, said two levers having bifurcated portions with cam surfaces subject to said valve actuating crank, said cam surfaces of said two levers being coincident in part, and extending at an angle to each other in part, whereby similar movement will be imparted to said two valves at certain times and differential movements imparted thereto at other times.

4. In a four-cycle explosive engine, the combination with a cylinder, a piston, an engine crank shaft and connecting rod, of a valve actuating crank driven from said engine crank at one-half the speed thereof, coöperating sleeve-like primary and secondary valves working, one within the other, and controlling admission and exhaust to and from said cylinder, and a pair of levers independently connected to said two valves, said two levers having bifurcated portions with cam surfaces, the said cam surfaces of said two levers in part being co-incident, and in part extending at an angle to each other, whereby said two valves will be given like movements at certain times and differential movements at certain other times.

In testimony whereof I affix my signature in presence of two witnesses.

OSCAR M. BERGSTROM.

Witnesses:
BERNICE G. WHEELER,
HARRY D. KILGORE.

Copies of this patent may be obtained for five cents each, by addressing the "Commissioner of Patents, Washington, D. C."